United States Patent [19]

Higasa et al.

[11] Patent Number: 5,222,568
[45] Date of Patent: Jun. 29, 1993

[54] ELECTRIC VEHICLE

[75] Inventors: Hiromasa Higasa; Fumihiko Ishikawa; Shigenori Matsumura; Hidetoshi Nasu, all of Takamatsu; Kazunobu Sato, 52-30, Aza Ryuo, Aihata, Ishii-cho, Myozai-gun, Tokushima 779-32, all of Japan

[73] Assignees: Kabushiki Kaisha Shikoku Sogo Kenkyujo, Kagawa; Kazunobu Sato, Tokushima, both of Japan

[21] Appl. No.: 613,756
[22] PCT Filed: Mar. 30, 1990
[86] PCT No.: PCT/JP90/00436
§ 371 Date: Jan. 29, 1991
§ 102(e) Date: Jan. 29, 1991
[87] PCT Pub. No.: WO90/11905
PCT Pub. Date: Oct. 18, 1990

[30] Foreign Application Priority Data

Mar. 31, 1989 [JP] Japan .................................. 1-83374
Dec. 6, 1989 [JP] Japan .................................. 1-317345

[51] Int. Cl.[5] .............................................. B60K 1/00
[52] U.S. Cl. .................................. 180/65.5; 180/165; 180/234; 180/242
[58] Field of Search ................. 180/65.5, 65.1, 234, 180/244, 79.1, 907, 242, 165

[56] References Cited

U.S. PATENT DOCUMENTS 4,805,712 2/1989 Singleton ....................... 180/907

FOREIGN PATENT DOCUMENTS 2561593 9/1985 France ........................... 180/65.5
158163 9/1982 Japan ............................ 180/244

Primary Examiner—Eric D. Culbreth
Attorney, Agent, or Firm—Keck, Mahin & Cate

[57] ABSTRACT

The present invention relates to an improvement of the driving characteristics of an electric vehicle in which each of the driving wheels is adapted to be driven by its individual driving motor, and more particularly, firstly to an improvement of the driving characteristics of the electric vehicle without complication of the mechanical structure thereof and secondly to an improvement of the motion characteristics of the electric vehicle by simplifying the structure of steering wheel also having a function of driving wheel and by increasing the degree of freedom of the swiveling action of the steering wheel.

In order to achieve these objects, according to the present invention, each of the driving wheels arranged at both sides of the electric vehicle is provided with an independently controlled driving motor and such a structure is applied also to the steering wheels.

1 Claim, 8 Drawing Sheets

ELECTRIC VEHICLE

FIELD OF THE INVENTION

The present invention relates to an electric vehicle having wheels driven by electric motors, and particularly to improvements of the driving characteristics of the electric vehicle.

PRIOR ART

With the advances in recent automobile technology, several new technologies have been proposed for improving the driving characteristics such as 4-wheel steering (4WS), 4-wheel driving (4WD), anti-skid brake system (ABS) and traction control.

However, these new technologies are concerned with handling the driving force of each front and rear wheel. Therefore, in order to carry out the above-mentioned new automobile technologies, it is necessary to control each wheel properly, (based upon the necessary conditions) by adding new mechanical structures to the automobile structures of the prior art.

In general, an automobile is provided with steering wheels for changing the traveling direction of the vehicle and driving wheels for driving the vehicle. Recently, for improving vehicle driving characteristics and for securing a sufficient inside vehicle space, a front-drive (and a 4WD) vehicle has been widely used in which steering wheels also function as driving wheels.

PROBLEMS SOLVED BY THE PRESENT INVENTION

A conventional vehicle usually uses a driving system in which the power from a single power source (an engine) is divided into plural driving wheels. Accordingly, new mechanisms, which are added to carry out the above new technologies, as well as the resulting mechanical structure into which the new mechanisms are incorporated, tend to complicate the mechanical structure of the vehicle because of the driving system. This is the same case for an electric vehicle.

In the case where the steering wheels not only have a steering function but also a driving function, it is necessary not only to swivel each of the steering wheels about its king pin shaft, but also to impart the driving force to each of the steering wheels. Accordingly, the mechanical structure for performing both the steering and driving functions becomes very complicated.

It is therefore a main object to improve the driving characteristics of an electric vehicle and to provide an electric vehicle having a simple mechanical structure easily carrying out the new technologies mentioned above.

It is a second object to improve the driving characteristics of an electric vehicle by simplifying the structure of steering wheels which have both steering and driving functions and by increasing the degree of freedom of the swiveling motion of steering wheels.

MEANS FOR SOLVING THE PROBLEMS AND EFFECTS

A first characteristic feature of the present invention for achieving the main object resides in an electric vehicle having driving wheels arranged at both sides of a vehicle body wherein each of the driving wheels is respectively provided with a mutually independent driving motor, and both the driving torque and the braking torque of each driving motor are adapted to be independently controlled based upon signals from the traveling conditions of the vehicle.

A second characteristic feature of the present invention for achieving the second object resides in an electric vehicle having steering wheels each mounted on its king pin shaft swivelably therearound, and each being independently driven by a driving motor. Each of the driving motors is formed by a stator arranged coaxially with an axle of each steering wheel, and a rotor mounted on a wheel-rim of the steering wheel and adapted to be fitted around the stator.

According to the first feature of the present invention, it is possible to perfectly avoid all of the problems of the prior art concerning the distribution of the driving force. Also, it is easy to independently and freely vary the peripheral velocity, the driving force and the braking force of each of the driving wheels by independently controlling the driving torque and the braking torque of each of the driving motors.

It is therefore possible to easily carry out the new technologies mentioned above requiring careful control of the driving force of each wheel by a simple mechanical structure, without the need for a special mechanical structure. Thus it is possible to improve the driving characteristics of an electric vehicle.

According to the second feature of the present invention, since each of the driving motors can be mounted on each steering wheel integrally therewith, it is possible to omit any mechanical structure for transmitting power to each of the steering wheels requiring a swivel motion. Thus, it is possible to simplify the mechanical structure of an electric vehicle.

Accordingly, since the mechanical members disturbing the swivel motion of each steering wheel around its king pin shaft can be almost eliminated, it is possible to increase the swiveling angle of each steering wheel. Thus, it is possible to improve the driving characteristics of an electric vehicle.

BRIEF DESCRIPTION OF THE DRAWINGS

FIGS. 1 through 6 show a first embodiment of the present invention wherein:

FIG. 1 is a schematic plan view showing a power transmitting apparatus of an electric vehicle of the present invention;

FIG. 2 is a schematic side elevational view of an electric vehicle of FIG. 1;

FIG. 3 is a block diagram showing a control apparatus of the power transmitting apparatus of FIG. 1;

FIG. 4 is an explanatory drawing of a 4WS function at a low-speed traveling mode;

FIG. 5 is an explanatory drawing of a 4WS function at a high speed traveling mode; and FIG. 6 is a flowchart showing the control an electric vehicle of FIG. 1.

FIG. 7 through 13(d) show a second embodiment of the present invention wherein:

FIG. 7 is a sectional view taken along a line I—I in FIG. 12;

FIG. 8 is an enlarged view of the upper portion of a king pin shaft;

FIG. 9 is a sectional view of a driving motor;

FIG. 10 is a perspective view of a rotor of a driving motor;

FIG. 11 is a perspective view of a squirrel-cage rotor;

FIG. 12 is a schematic plan view showing the arrangement of wheels of an electric vehicle of the present invention;

FIG. 13 is an explanatory drawing showing the traveling condition of an electric vehicle of the present invention wherein:

FIG. 13 (a) is an explanatory drawing of an oblique traveling;

FIG. 13 (b) is an explanatory drawing of a small-turn traveling;

FIG. 13 (c) is an explanatory drawing of a spin-turn traveling; and

FIG. 13 (d) is an explanatory drawing of a sidewise traveling.

EMBODIMENTS

In FIGS. 1 through 6 there is shown an electric vehicle 1 of a first embodiment of the present invention. The electric vehicle shown is a 4-wheel drive type vehicle (hereinafter referred to "4WD" as vehicle) having a function of 4-wheel steering (hereinafter referred to as "4WS"), a function of anti-skid brake system (hereinafter referred to as "ABS") and a function of traction control.

Figure 1:
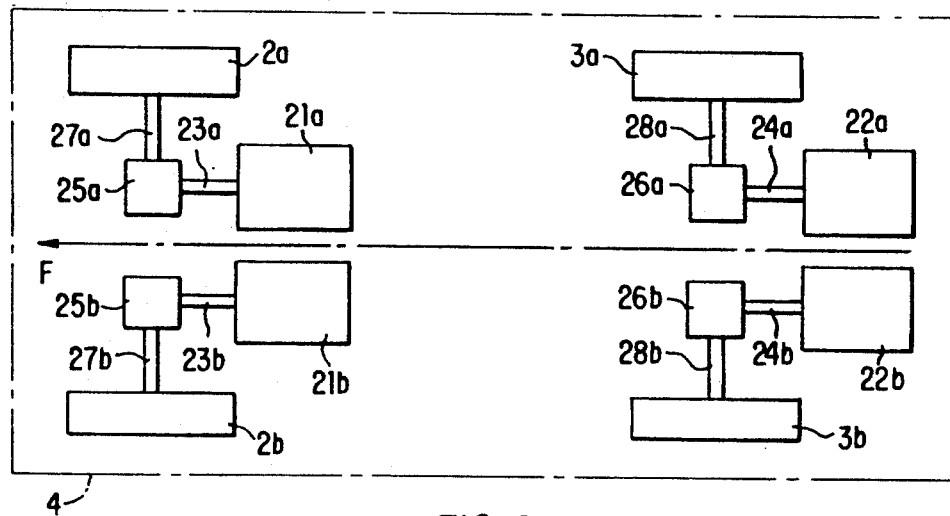
Figure 2:
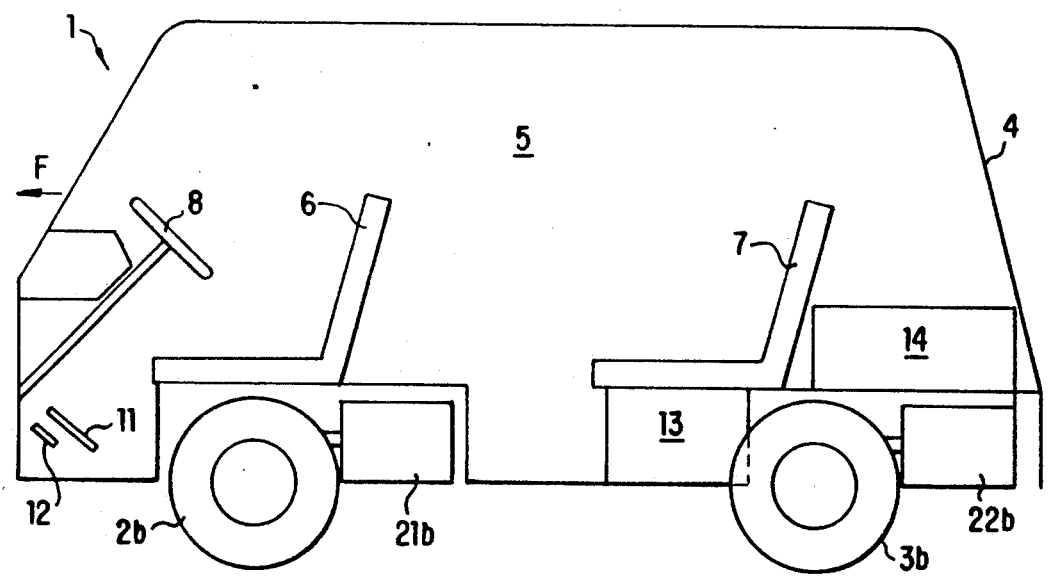

As shown in FIGS. 1 and 2, the electric vehicle 1 of the present invention has two front wheels 2a and 2b arranged at both sides of the front direction (arrow F) of the vehicle, two rear wheels 3a and 3b and a body 4 supported on the front and rear wheels 2a and 2b, 3a and 3d. There are provided a front seat 6 and rear seat 7 within a cabin 5 formed by the body 4.

In front of the front seat 6, there is arranged a steering handle 8 to which the front wheels 2a and 2b are connected via a steering mechanism (not shown) including, for example, an Ackermann steering mechanism. Accordingly, the front wheels 2a and 2b function as steering wheels.

An acceleration pedal 11 for controlling the rotational speed of the front and rear wheels 2a and 2b, 3a and 3b and a brake pedal 12 for operating a hydraulic braking system (not shown) are also arranged in front of the front seat 6.

Under the rear seat 7, there are arranged batteries 13 for supplying electric power to the driving motors which drive each of the front and rear wheels. A controller 14 for controlling each driving motor is also arranged behind the rear seat 7. FIG. 1 shows a power transmitting apparatus (i.e. a driving apparatus) of the electric vehicle 1 of the present invention.

Each of the driving systems for right and left front wheels 2a and 2b and for right and left rear wheels 3a and 3b have a same mechanical structure. Front axles 27a and 27b, respectively for the front wheels 2a and 2b and rear axles 28a and 28b, respectively for the rear wheels 3a and 3b, are drivingly rotated by driving motors 21a, 21b, 22a and 22b. Each driving motor 21a, 21b, 22a and 22b forms a power source respectively for each of the front and rear wheels 2a, 2b, 3a and 3b via driving shafts 23a, 23b, 24a and 24b which each extend respectively from driving motors 21a, 21b, 22a and 22b and their gear boxes 25a, 25b, 26a and 26b.

Each of the driving motors 21a, 21b, 22a and 22b is driven by electric power from the batteries 13 and is independently controlled by signals from the controller 14.

Figure 3:
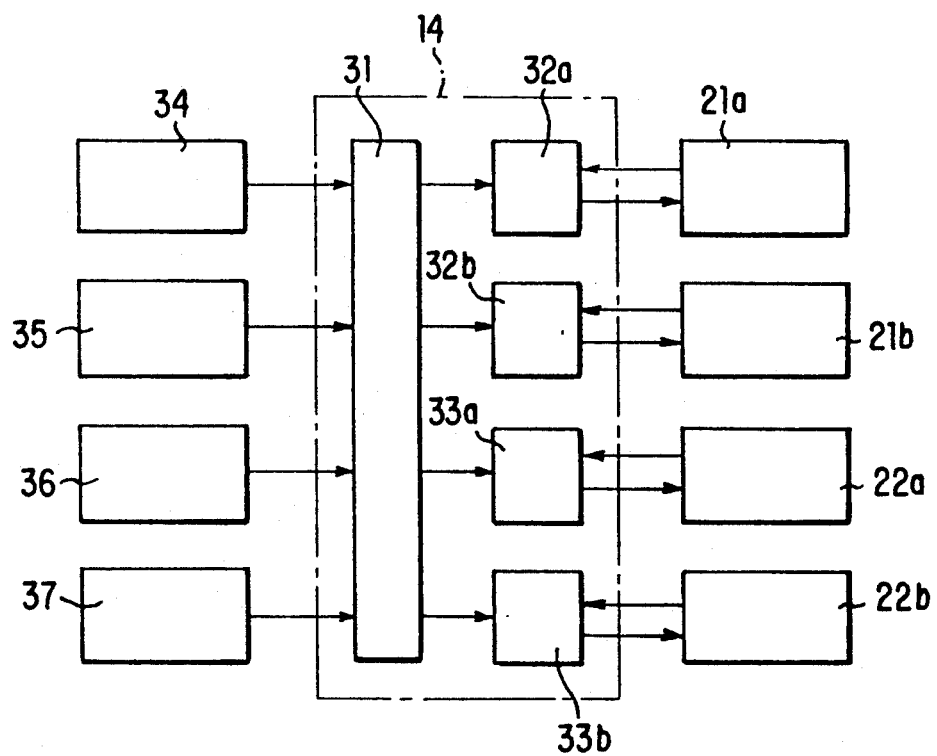

The controller 14 for controlling the driving motors 21a, 21b, 22a and 22b of the electric vehicle 1 is constructed as shown in the block diagram of FIG. 3.

The controller 14 has a computer 31 and four motor-controllers 32a, 32b, 33a and 33b. The driving motors 21a, 21b, 22a and 22b are independently controlled by signals from the motor-controllers 32a, 32b, 33a and 33b.

Inputted into the computer 31 are the following signals: signals from wheel rotation detecting sensors 34 each mounted in conjunction with each of the driving motors 21a, 21b, 22a and 22b for detecting the rotational speed of each wheel (the signal(s) are hereinafter referred to "wheel rotation signal(s)"); a steering angle signal from steering angle sensor 35 mounted on the column of the steering handle 8 (the signal is hereinafter referred to "steering signal"); an acceleration order signal detected by an acceleration sensor 36 mounted on the acceleration pedal 11 (the signal is hereinafter referred to "acceleration signal"); and a brake order signal detected by a brake sensor 37 mounted on the brake pedal 12 (the signal is hereinafter referred to "brake signal").

If one desires to get a wheel rotation signal from a wheel which is not driven by any driving motor, the wheel rotation detecting sensor 34 can be mounted on the wheel itself, or its axle.

The signals mentioned above are operated in accordance with a program stored in a memory means such as a ROM (Read Only Memory) in the computer 31 and are compared with traveling data of the electric vehicle 1 stored in the memory means. The outputs from the computer 31 are inputted into the motor-controllers 32a, 32b, 33a and 33b of the driving motors 21a, 21b, 22a and 22b to properly control the rotational condition thereof in order to obtain the optimum driving force and braking force of each wheel.

The functions of 4WS, 4WD, ABS and traction control of this embodiment will be hereinafter described in more detail.

Figure 4:
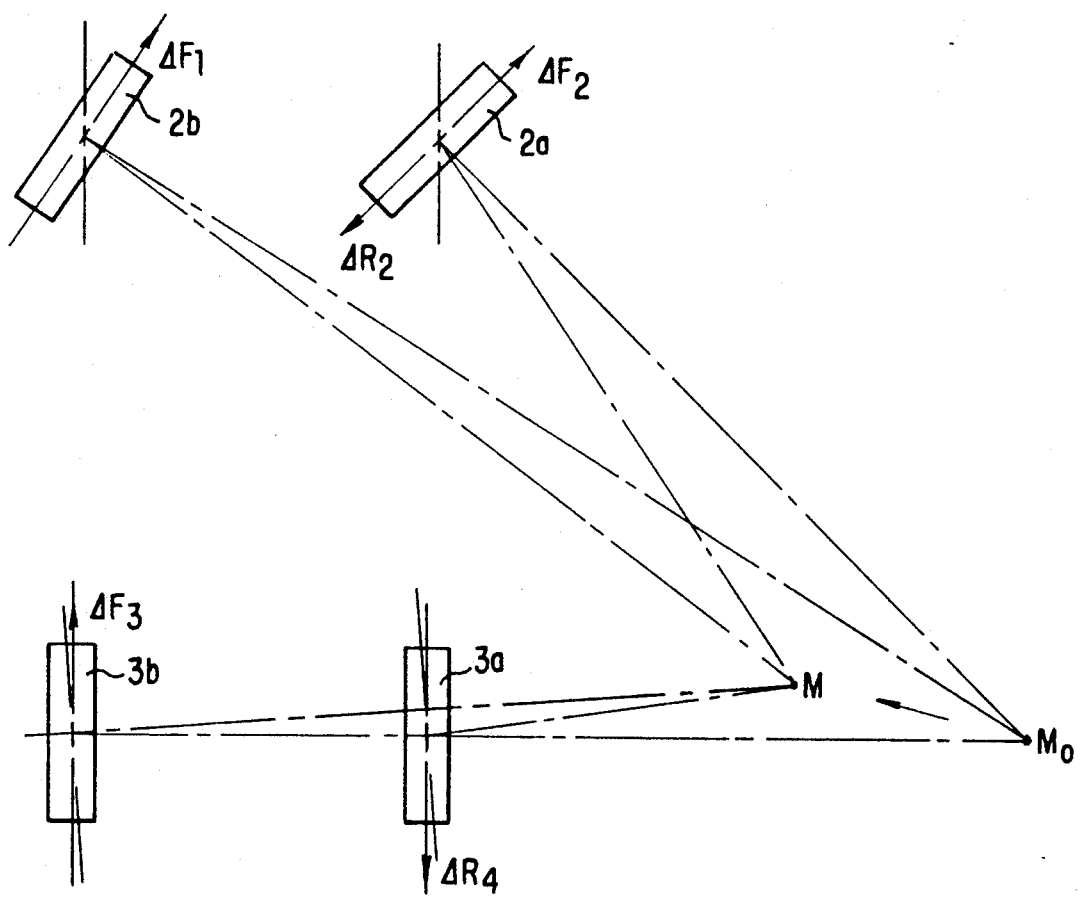

Firstly, the 4WS function at a low-speed traveling mode will be described with reference to FIG. 4.

Point MO is a turning center of the vehicle 1 when the vehicle 1 is steered by the steering handle 8 in a conventional manner. Whereas when the vehicle 1 is controlled by driving the radially outward front wheel 2a and rear wheel 3b at driving forces ΔF1 and ΔF3, respectively, and by driving the radially inward front and rear wheels 2a and 3a at a driving force ΔF2 smaller than the driving forces ΔF1 and ΔF3, or by braking the radially inward front and rear wheels 2a and 3a at braking forces ΔR2 and ΔR4, a steering effect similar to a caterpiller-type vehicle arises between the right and left rear wheels 3a and 3b. Accordingly, the turning center of the vehicle 1 occupies a position M which is nearer to the body of vehicle 1 than the position MO and the turning radius of the vehicle is reduced. That is, the 4WS effect is thus easily achieved according to the present invention.

It is preferable to carry out the control of the 4WS drive mentioned above under a condition that all of the resultant force of the driving forces arising in each wheel in forward and rearward directions become equal, so that no acceleration toward the traveling direction of the vehicle 1 is generated. Thus, the stability in the travel of the vehicle is improved.

Figure 5:
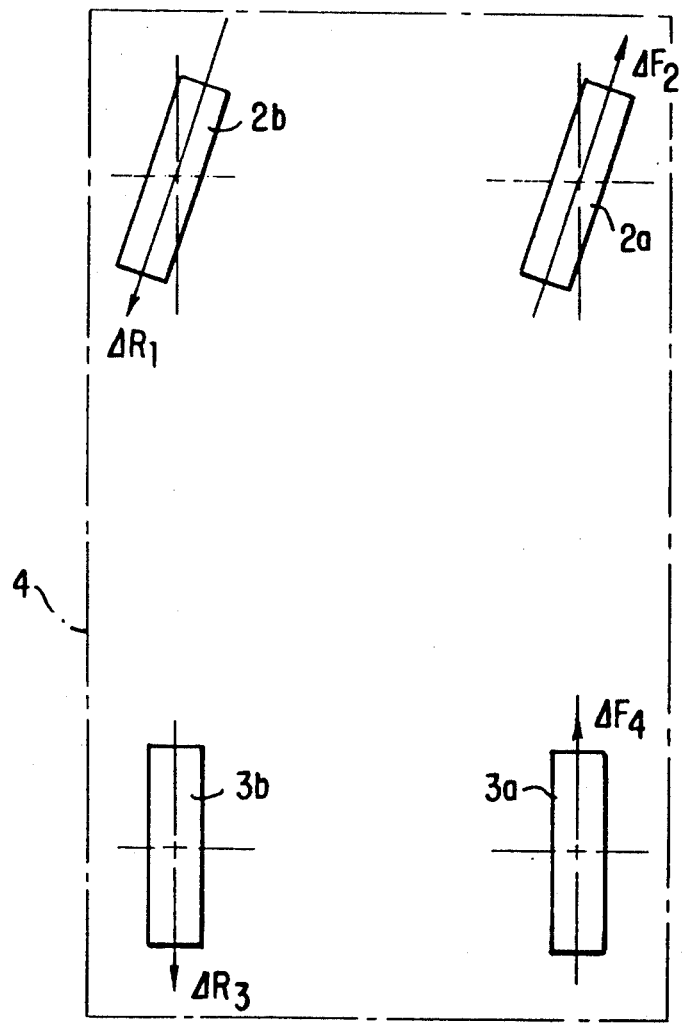

Next, the 4WS function at a high speed traveling mode will be described with reference to FIG. 5.

In general, when a vehicle turns at high speed, the vehicle tends to travel in a direction more inward relative to the instantaneous traveling direction of the vehicle due to an excessive yawing moment of the vehicle.

This embodiment of the present invention intends to improve the stability of the vehicle at high speed traveling. It does so by controlling the driving force and the braking force of each wheel, and by generating a moderate yawing moment cancelling the excessive yawing moment, making the instantaneous traveling direction of vehicle coincident with the direction of the body of vehicle.

When the vehicle 1 is given a right hand turn, an excessive yawing moment in right hand direction around the center of gravity of the vehicle 1 is generated. By providing variations in driving force $\Delta F2$ and $\Delta F4$ and variations in braking force $\Delta R1$ and $\Delta R3$ in each wheel, thus generating a yawing moment of left hand direction in the body of vehicle 1 with the control of each driving motor, said yawing moment of right hand direction will be cancelled out and the attitude of the vehicle is thus stabilizingly controlled.

It is preferable, in this case, to use a regenerative braking force of each driving motor as a braking force to be applied to each wheel.

Similarly to the case of the 4WS drive at a low-speed mode, it is also preferable to carry out the control of the 4WS drive at a high-speed mode under a condition such that all of the resultant force of the driving forces arising in each wheel in forward and rearward directions become equal, so no acceleration toward the traveling direction of the vehicle 1 is generated.

According to the present invention it is possible to carry out 4WS function only by properly controlling the driving motor of each wheel without any other special mechanism. It is also possible to improve the stability in vehicle travel.

Next, the function of 4WD will be described. Since in the electric vehicle 1 of the present invention each of the wheels 2a, 2b, 3a and 3b is provided with individual driving motors 21a, 21b, 22a and 22b respectively, the function of full-time 4WD can be easily achieved by so controlling each driving motor that the rotational speed of wheels traveling in a straight direction becomes identical for each wheel.

In general, when a vehicle having a selective type 4WD function turns under a 4WD mode, a braking phenomenon is sometimes caused. This braking phenomenon occurs because of the difference in traveling distance between the radially outward wheels and radially inward wheels, and because of the absence of any differential motion means between the front wheels and rear wheels.

In the electric vehicle 1 of the present invention, since each wheel 2a, 2b, 3a and 3b is provided with a driving motor for individually driving its related wheel, it is possible to improve the braking phenomenon by properly controlling the driving motors so that the rotational speed of the driving motors (e.g. driving motor 22a) for the radially inward wheels (e.g. rear wheel 3a having the smallest turning radius) becomes lower than the rotational speed of the driving motors (e.g. driving motor 21b) for the radially outward wheels (e.g. front wheel 2b having the largest turning radius).

Next, the function of ABS of the electric vehicle 1 of the present invention will be described. According to the present invention, the braking force and the driving force of each driving motor are adapted to be determined or corrected by determining the angular acceleration of each wheel. This acceleration is based upon the wheel rotation signals from the wheel rotation sensors 34 mounted on each of the wheels 2a, 2b, 3a and 3b, by determining the required braking force and the required angular acceleration of each wheel from braking signals, the steering signals, the vehicle speed and e.g. previously stored limit braking force, and by considering the road surface conditions.

The limit braking force can be determined by operating signals from each of the sensors. Adjustment of the braking force can be achieved by adjusting the regenerating braking force and the driving force of each of the driving motors.

According to the present invention, since the driving force and the braking force of each of the driving motors are corrected, the driving force and the braking force of each of the driving motors never exceed the limit braking force, and prevent the skid of the vehicle 1 while being braked. Thus, the function ABS can be obtained.

Next, the function of the traction control of the present invention will be described. Previously stored in the memory means of computer 31 is a limit value of the rotational angular acceleration of each wheel of vehicle 1 of this embodiment, which can be adapted to a road surface condition having a small coefficient of friction (such as a snow-covered road). The driving force of each driving motor can be determined by the rotational angular acceleration of each wheel (from the wheel rotation signal). The required angular acceleration of each wheel can be obtained by determining the required driving force and the required angular acceleration of each wheel, and by considering the road surface condition.

The limit driving force may be determined by an operated value of a signal from each sensor.

According to the present invention, the resulting operation never exceeds said limit value, even though the acceleration order exceeds the limit driving force. Thus, rotation of a wheel under the driving force exceeding the limited value is prevented. Therefore, the function of traction control can be obtained by limiting the transmission of the acceleration order to each driving motor.

In this case, if the braking force is simultaneously detected, it will surely be able to prevent the slippage of the vehicle on a road having a small coefficient of friction due to the contribution of said ABS function.

Figure 6:
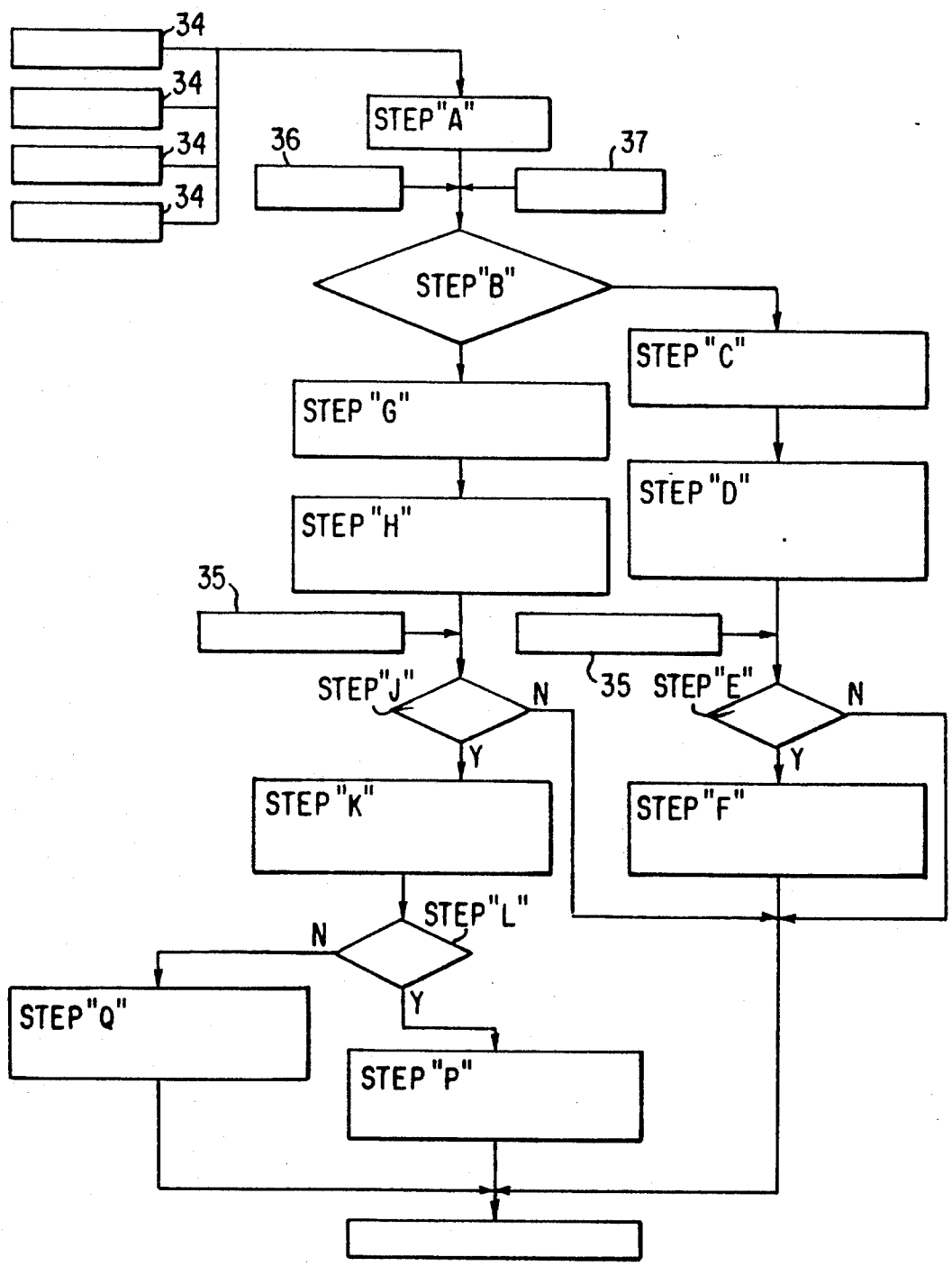

The signals from the sensors are processed by computer 31 along a program shown in FIG. 6, in order to effectively exhibit all of the functions mentioned above.

First of all, the wheel rotation signals from each of the wheel rotation sensors 34 mounted on driving motors 21a, 21b, 22a and 22b of wheels 2a, 2b, 3a and 3b are inputted into the computer 31 and the speed of the vehicle 1 is determined therefrom (STEP "A").

Next, the acceleration signal from acceleration sensor 36 arranged at acceleration pedal 11, and the braking signal from brake sensor 37 arranged at brake pedal 12, are inputted into computer 31, and computer 31 determines from these acceleration and braking signals whether the vehicle 1 is decelerated or not (STEP "B"). The program goes to a STEP "C" on deceleration, and to a STEP "G" on acceleration or constant speed.

The required braking force and the required angular acceleration are determined from the braking signal, the vehicle speed and the limit braking force at the STEP "C" and then it goes to a STEP "D".

At STEP "D", the braking force (torque) and driving force (torque) of each driving motor are determined, in consideration of the road surface condition, from the angular acceleration of each wheel (obtained from each wheel rotation signal) and the required angular acceleration of each wheel. Next, the program goes to a STEP "E".

The program determines at STEP "E" (by the steering signal from the steering angle sensor 35) whether vehicle 1 is now in a turn or not. It goes to STEP "F" in case of a "yes", and it is outputted to the motor controller in case of a "no".

The required angular acceleration of each wheel is corrected at STEP "F", comparing the limit braking force in consideration of the cornering force due to the turn of vehicle 1. Then, the determined results of the amount of control for each driving motor are outputted to each motor controller.

STEPS "D" through "F" correspond to the ABS function.

When determined as "not on deceleration" at the STEP "B" above, the program goes to STEP "G". The required driving force and the required angular acceleration of wheel are determined, from the acceleration signal, the vehicle speed and the limit driving force at this STEP "G". Then, the program goes to STEP "H".

At STEP "H", the braking force and the driving force of each driving motor are determined, in consideration of the road surface condition, from the angular acceleration of each wheel obtained from each wheel rotation signal and the required angular acceleration of wheel. Then, the program goes to STEP "J".

STEPS "G" and "H" correspond to the function of traction control.

It is determined at STEP "J", by the steering signal from the steering angle sensor 35, whether the vehicle is now on a turn or not. The program goes to a STEP "K" in case of a "yes", and the determined result of the amount of control of each driving motor is outputted to each motor controller.

The driving force and the braking force are determined at STEP "K", in order to obtain the corrected value (i.e., the braking phenomenon preventing function for traveling in 4WD mode) from the steering signal and from each wheel rotation signal in consideration of the difference in traveling distance between the radially inward wheels and the radially outward wheels. Then the program goes to STEP "L".

At STEP "L" it is determined from the vehicle speed whether the vehicle is traveling at a high speed or not. The program goes to STEP "P" in case of "yes", and to STEP "Q" in case of "no".

When determined at STEP "L" that the vehicle is traveling at a high speed, the yawing moment of the vehicle 1 is determined at STEP "P" from the steering signal, each wheel rotation signal, and the vehicle speed, thus obtaining the corrected value of each driving force for cancelling the yawing moment (i.e., the 4WS function for traveling at high speed).

When determined at STEP "L" that the vehicle is not at high speed travel, the difference in the driving force between the driving wheels for minimizing the turning radius of the vehicle is determined from the steering signal, each wheel rotation signal, and the vehicle speed, thus obtaining a corrected value of the driving force of each driving wheel (i.e., the 4WS function for traveling at low speed).

The corrected value of each driving force thus obtained is then inputted to the motor controller of each driving motor and is used to properly adjust the driving force and the braking force of each wheel.

As described above, according to an embodiment of the present invention, since the control system is constructed as a single computer system, adapted to achieve the travel control and attitude control of the vehicle by effectively utilizing the signals obtained during the travel of the vehicle and by controlling the driving force and the braking force of each wheel, it is possible to improve the stability in travel of the vehicle and thus the driving characteristics of the electric vehicle.

Although the embodiment shown above has the four functions of 4WS, 4WD, ABS and traction control, it is not necessary to provide the vehicle with all of these functions.

In accordance with the first embodiment of the present invention, it is possible to solve all of the problems relating to the distribution of the driving force in the prior art; it is also easy to freely and independently vary the peripheral velocities and the driving forces of the wheels of both sides of the vehicle.

Accordingly, it is easy to implement the new technologies, such as 4WS, 4WD, ABS and traction control, which require the adjustments of driving force etc. of each wheel; and to implement the new technologies with the use of a relatively simple mechanical structure. Thus, the driving characteristics of the electric vehicle can be improved.

The second embodiment of the present invention will be described with reference to FIGS. 7 through 13(d).

An electric vehicle 51 (FIG. 12) of the second embodiment is a 4-wheeled automobile having a 4WS function, wherein each wheel of the vehicle is mounted on a king pin shaft swivelably therearound. The construction of a steering mechanism, a driving mechanism and a suspension mechanism (FIG. 12) are clearly shown in FIG. 7.

Figure 7:
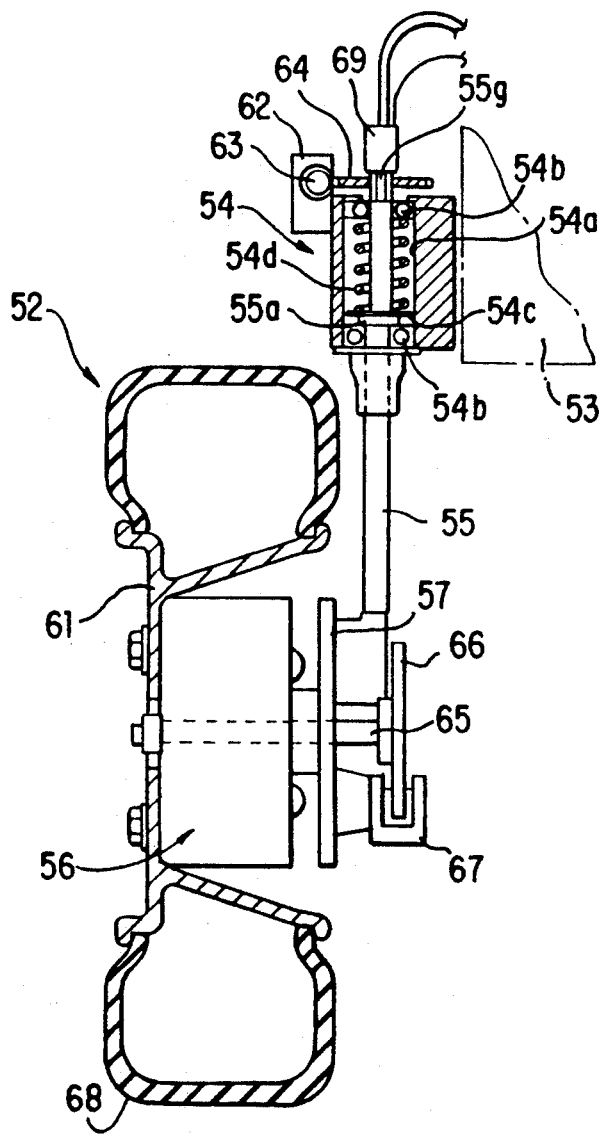

In FIG. 7, a numeral 52 demotes a wheel and a numeral 53 denotes a frame.

A supporting means 54 is secured on one side of the frame 53 and has a through bore 54a. Bearings 54b are arranged at top and bottom ends of the bore 54a.

The wheel 52 is mounted on the bottom end of king pin shaft 55 which is passed through bore 54a of supporting means 54.

The upper portion of king pin shaft 55 is integrally formed with a flange portion 55a, and the lower end portion of king pin shaft 55 is integrally secured to base plate 57 by welding and other suitable ways. The base plate 57 forms a frame for a driving motor hereinafter mentioned and is adapted to horizontally support an axle 65.

A coil spring 54d is interposed between a washer 54c mounted on the upper surface of flange portion 55a and the lower surface of upper bearing 54b secured on supporting means 54. The king pin shaft 55 is vertically movable relative to supporting means 54 and also is movable around its own axis.

A boss 71 and a boss aperture 74 is formed at the center of base plate 57. A stator coil 73 is secured around the outer circumferential surface of boss 71, and axle 65 of wheel 52 is rotatably mounted in boss aperture 74 (see FIG. 9).

Axle 65 is rigidly fixed to rotor frame 76, which is secured to wheel rim 61 of wheel 52. Axle 65 is projected inside base plate 57 and a brake disc 66 is secured on the inner end of axle 65.

Brake caliper 67 supported on base plate 57 is so arranged that it faces the peripheral surfaces of brake disc 66 to provide the braking action thereto. In FIG. 7, a numeral 68 denotes a tire of wheel 52.

A worm wheel 64 is secured on the end of king pin shaft 55 above supporting means 54, and worm 63 driven by geared motor 62 is arranged near worm wheel 64 to mesh therewith.

When driving geared motor 62, wheel 52 is steered via king pin shaft 55, base plate 57 and axle 65.

Worm wheel 64 is fitted on a splined portion 55g of king pin shaft 55. Therefore, it is always kept in a matching position with worm 63 and enables the power transmission therebetween despite the vertical movement of king pin shaft 55.

Figure 9:
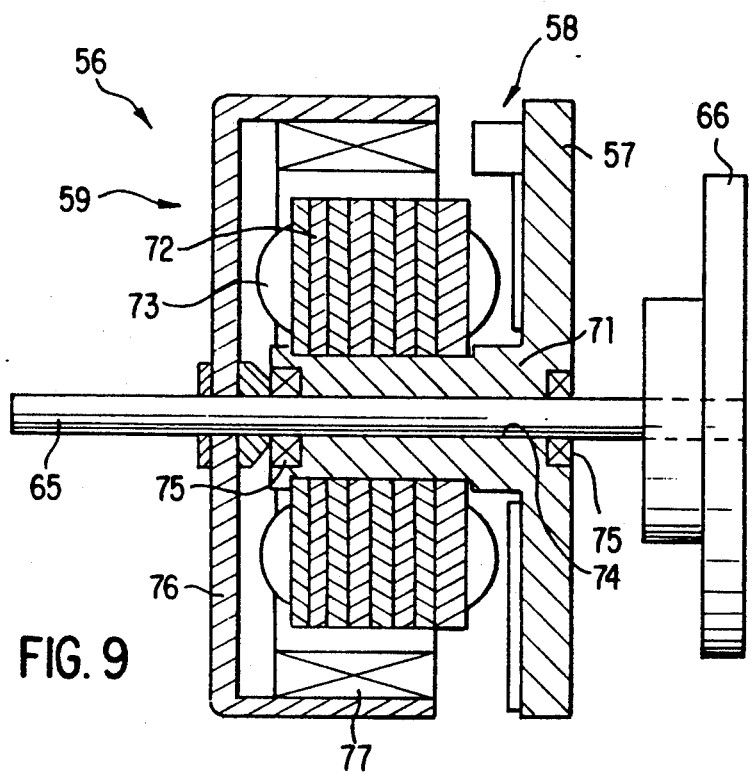
Figure 10:
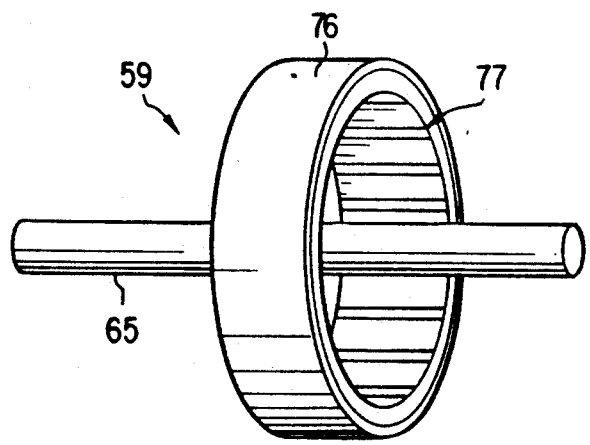
Figure 11:
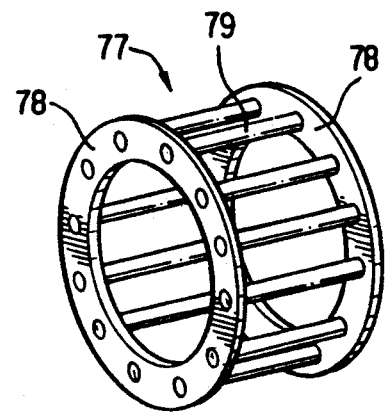
Figure 12:
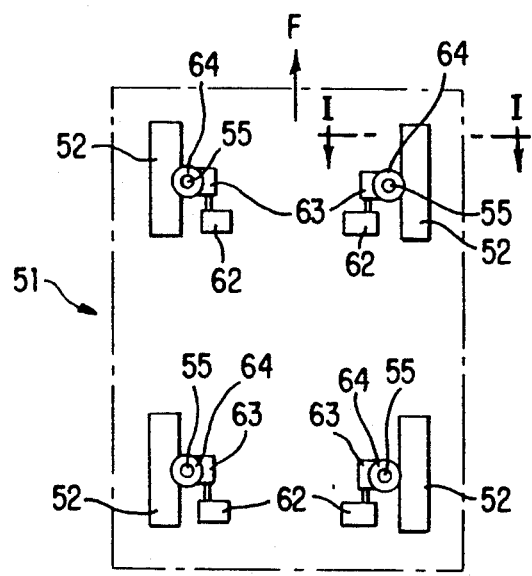

As shown in FIGS. 9 through 11, an outer-rotor type induction motor 56 is constructed as a wheel driving motor between base plate 57 and rim 61 of wheel 52.

That is, driving motor 56 comprises a stator 58 and a rotor 59. A yoke 72 formed by a plurality of laminated steel plates is mounted on boss portion 71 therearound and a stator coil 73 is wound in yoke 72.

Axle 65 forming a shaft of rotor 59 is rotatably supported by bearings 75 arranged within aperture 74 of boss portion 71.

As shown in FIG. 10, rotor 59 is formed by rotor frame 76 and axle 65 arranged at the center of rotor frame 76.

The squirrel-cage rotor 77 shown in FIG. 11 is fitted within rotor frame 76 along the inner peripheral surface thereof.

Squirrel-cage rotor 77 is formed by two ends rings 78 and a plurality of conductors 79, and acts as a rotor coil generating a rotational force relative to stator coil 73.

Driving motor 56 is thus formed by inserting the shaft of rotor 59, i.e., axle 65, into bearings 75 mounted in aperture 74 of boss 71 of stator 58.

That is, when axle 65 is properly mounted into bearings 75, squirrel-cage rotor 77 forming the rotor coil is so arranged that it covers the periphery of stator coil 73 mounted around boss 71. Accordingly, rotor 59 is rotated abound boss aperture 74 of stator 58 when the power for the driving motor is switched on.

According to driving motor 56 of the second embodiment of the present invention, since rotor 59 is rotatably positioned around stator 58, it is easy to form driving motor 56 by merely connecting rotor frame 76 of rotor 59 to rim 61 of wheel 52 by using fastening means such as bolts.

In this embodiment the electric power is supplied to driving motor 56 via a joint portion 69 arranged above king pin shaft 55.

Figure 8:
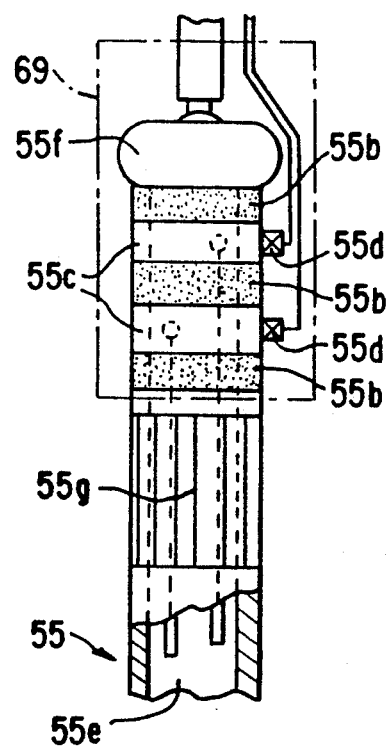

As shown in FIG. 8, joint portion 69 comprises slip rings 55c which are electrically isolated from each other by isolating rings 55b and carbon brushes 55d, each contacting the peripheral surface of each slip ring 55c. Electric cables connected to slip rings 55c are passed through an aperture 55e formed in king pin shaft 55 and are led to driving motor 56.

In this embodiment, aperture 55e formed in king pin shaft 55 also has a function of a passage of the pressurized liquid supplied via a swivel joint 55 for operating brake caliper 67.

As described above, according to the structure of the present invention, since the driving means for each wheel 52, i.e., driving motor 56, comprises stator 58 arranged coaxially with axle 65 and rotor 59 formed in rim 61 of each wheel 52 and fitted around stator 58, it is possible to eliminate any mechanical power transmission structure to impart the driving force to each wheel 52.

Accordingly, it is possible to effectively utilize the large space left at the side of each wheel 52, thus increasing the steering angle (i.e., the swiveling angle of wheel 52) much more than that of the prior art. Thus, it is possible to drive the vehicle in various manners which are difficult in a vehicle of the prior art.

For example, a vehicle 51 having such four wheels 52 will be driven same as the vehicle 1 of the first embodiment by controlling each driving motor 62 of each wheel 52. Further, by properly controlling each geared motor 62 of each wheel 52, it is possible to drive vehicle 51 in various manners as shown in FIG. 13. An arrow "F" in FIG. 13 shows the front direction of vehicle 51.

Figure 13A:
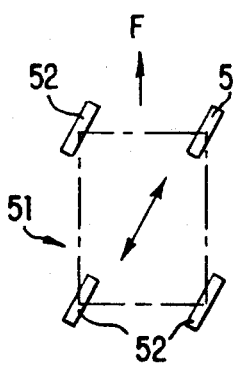

When all of the wheels 52 are directed in an oblique direction as shown in FIG. 13(a), vehicle 51 can continue an oblique travel keeping the attitude of vehicle 51 in the constant oblique direction.

This means that vehicle 51 can change a traffic lane keeping its stable attitude even during high speed travel.

Figure 13B:
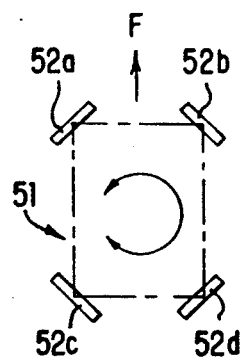

When the direction of front wheels 52a and 52b is directed opposite to that of rear wheels 52c and 52d as shown in FIG. 13(b), it enables vehicle 51 to turn at a smaller turning radius.

Figure 13C:
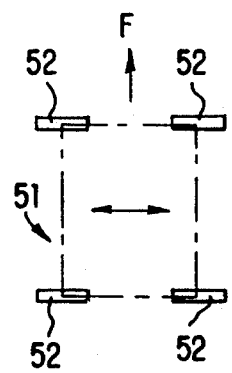

Further, when the direction of each of the front wheels 52a and 52b and the direction of each of the rear wheels 52c and 52d are directed opposite to each other as shown in FIG. 13(c), it enables vehicle 51 to turn around the turning center positioned within the vehicle body (the so-called "spin turn") and further improve the motion characteristics of electric vehicle 51.

Figure 13D:
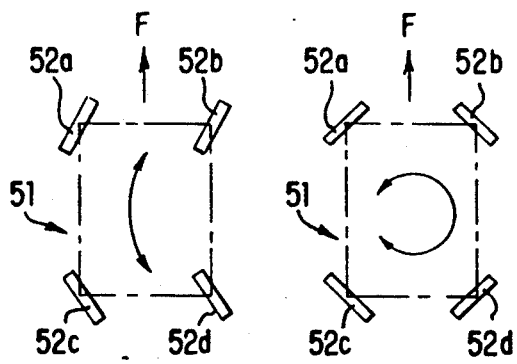

When all of the wheels 52 are directed transversely to the front direction "F" of vehicle 51 as shown in FIG. 13(d), it enables vehicle 51 to move in a sidewise direction, thus making column parking of vehicle 51 very easy.

According to the present invention, since driving motor 56 of each wheel 52 is adapted to be positioned within rim 61 of each wheel 52, a large projection required in the prior art for the installation of the driving motor is eliminated. Therefore, a large space can be maintained between wheels 52.

Although the present invention has been described with respect to a four-wheeled 4WS vehicle, it can be easily understood that the present invention can be applied similarly to a front-wheel drive vehicle or a rear-wheel drive vehicle having a rear wheel steering mechanism.

According to the second embodiment of the present invention, since wheel driving motors can be installed integrally with the steering wheel, it is possible to eliminate the power transmitting mechanisms to the steering wheels, thus simplifying the mechanism of the vehicle.

This can reduce the structural members which would disturb the turning action of the steering wheels around their king pin shafts. Thus, it can increase the angular range of turning action of the steering wheels, and can therefore improve the motion characteristics of the vehicle.

We claim:

1. An electric vehicle having a steering wheel at both sides of said vehicle, driving motors for independently rotating each steering wheel, an axle connected to each said steering wheel, and king pin shafts for swivelling each steering wheel around said king pin shafts, each said steering wheel having a rim, and each said driving motor having a stator arranged coaxially with said axle and a rotor mounted on said rim of the steering wheel and adapted to be fitted around said stator, said electric vehicle comprising: a base plate supported by the king pin shaft at a bottom end of the king pin shaft, a boss portion projecting from the base plate and forming therein a horizontally extending boss aperture, the stator of the driving motor being formed around the boss portion, and the axle of the steering wheel also having a function of a shaft of the rotor being inserted into the boss aperture.

* * * * *